US012392386B2

(12) United States Patent
Chidambaram

(10) Patent No.: US 12,392,386 B2
(45) Date of Patent: Aug. 19, 2025

(54) DISC BRAKE SYSTEM AND METHOD FOR BRAKING A VEHICLE

(71) Applicant: VOLVO TRUCK CORPORATION, Gothenburg (SE)

(72) Inventor: Subramanian Chidambaram, Greensboro, NC (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 290 days.

(21) Appl. No.: 18/032,026

(22) PCT Filed: Jan. 20, 2021

(86) PCT No.: PCT/US2021/014077
§ 371 (c)(1),
(2) Date: Apr. 14, 2023

(87) PCT Pub. No.: WO2022/159084
PCT Pub. Date: Jul. 28, 2022

(65) Prior Publication Data
US 2023/0392660 A1   Dec. 7, 2023

(51) Int. Cl.
*F16D 65/18* (2006.01)
*B60T 1/06* (2006.01)
(Continued)

(52) U.S. Cl.
CPC ............ *F16D 65/183* (2013.01); *B60T 1/065* (2013.01); *B60T 8/17* (2013.01); *B60T 8/321* (2013.01);
(Continued)

(58) Field of Classification Search
CPC .... F16D 65/183; F16D 65/005; F16D 65/092; F16D 2069/002; F16D 55/226;
(Continued)

(56) References Cited

U.S. PATENT DOCUMENTS

2003/0106749 A1   6/2003   Yamaguchi et al.
2009/0099747 A1   4/2009   Kim
(Continued)

FOREIGN PATENT DOCUMENTS

CN   104919227 A   8/2015
GB   1305161 A    1/1973
(Continued)

OTHER PUBLICATIONS

European Search Report (Sep. 27, 2024) for corresponding European App. EP 21 92 1547.
(Continued)

*Primary Examiner* — Timothy Hannon
(74) *Attorney, Agent, or Firm* — WRB-IP PLLC

(57) ABSTRACT

A disc brake system includes a first brake pad having a first type of friction material, a second brake pad having a second type of friction material different from the first type of friction material, and a poshrod arrangement configured to apply force in varying amounts on both the first brake pad and the second brake pad, the poshrod arrangement comprising an actuator movable to different, positions relative to the first brake pad and the second brake pad to vary a percentage of total braking force applied by the first brake pad and the second brake pad. A method for braking a vehicle is also provided.

18 Claims, 2 Drawing Sheets

(51) Int. Cl.
  *B60T 8/17* (2006.01)
  *B60T 8/32* (2006.01)
  *F16D 65/00* (2006.01)
  *F16D 65/092* (2006.01)
  *F16D 55/226* (2006.01)
  *F16D 55/228* (2006.01)
  *F16D 69/00* (2006.01)

(52) U.S. Cl.
  CPC ......... *F16D 65/005* (2013.01); *F16D 65/092* (2013.01); *B60T 2250/00* (2013.01); *B60T 2250/04* (2013.01); *F16D 55/226* (2013.01); *F16D 55/228* (2013.01); *F16D 2069/002* (2013.01)

(58) Field of Classification Search
  CPC ...... F16D 55/228; F16D 55/224; B60T 1/065; B60T 8/17; B60T 8/321; B60T 2250/00; B60T 2250/04
  See application file for complete search history.

(56) References Cited

U.S. PATENT DOCUMENTS

| | | |
|---|---|---|
| 2009/0127034 A1 | 5/2009 | Kim |
| 2015/0136536 A1 | 5/2015 | Jeong et al. |
| 2015/0362034 A1 | 12/2015 | Jeong et al. |
| 2019/0390725 A1 | 12/2019 | Hartmann |

FOREIGN PATENT DOCUMENTS

| | | |
|---|---|---|
| GB | 2428759 A | 2/2007 |
| GB | 2515806 A | 1/2015 |
| SE | 532589 C2 | 3/2010 |
| WO | 2014161725 A1 | 10/2014 |

OTHER PUBLICATIONS

International Search Report (Apr. 1, 2021) for corresponding International App. PCT/US2021/014077.

DISC BRAKE SYSTEM AND METHOD FOR BRAKING A VEHICLE

BACKGROUND AND SUMMARY

The present invention relates to a disc brake system and method for braking a vehicle and, more particularly, to such a system and method wherein a brake pad of the system comprises a first brake pad having a first type of friction material and a second brake pad having a second type of friction material different from the first type of friction material.

Over the years, vehicles, particularly commercial vehicles, have been designed to transport heavier loads than they did in the past. Further, with improvements in active and passive safety measures and equipment, average vehicle speed limit has also tended to increase. Such developments have pushed vehicle brake design to the edge of engineering in order to meet the braking requirements at higher speeds and higher loads. Additionally, strict copper content laws have presented enormous challenges to brake designers.

Brake designers are presented with the challenge to provide optimal or at least acceptable friction under a range of operating temperature and wheel velocities while also minimizing brake wear and meeting legal requirements. It is difficult to provide brake pads that work well under all operating conditions.

It is therefore desirable to provide a disc brake system and method for braking a vehicle that can work well under a range of operating conditions without excessively compromising brake life.

In accordance with an aspect of the present invention, a disc brake system comprises a first brake pad having a first type of friction material, a second brake pad having a second type of friction material different from the first type of friction material, and a pushrod arrangement configured to apply force in varying amounts on both the first brake pad and the second brake pad, the pushrod arrangement comprising an actuator movable to different positions relative to the first brake pad and the second brake pad to vary a percentage of total braking force applied by the first brake pad and the second brake pad.

In accordance with another aspect of the present invention, a method is provided for braking a vehicle having a disc brake system, the disc brake system comprising a first brake pad having a first type of friction material, a second brake pad having a second type of friction material different from the first type of friction material, and a pushrod arrangement configured to apply force in varying amounts on both the first brake pad and the second brake pad. The method comprises moving an actuator of the pushrod arrangement to different positions relative to the first brake pad and the second brake pad to vary a percentage of total braking force applied by the first brake pad and the second brake pad.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
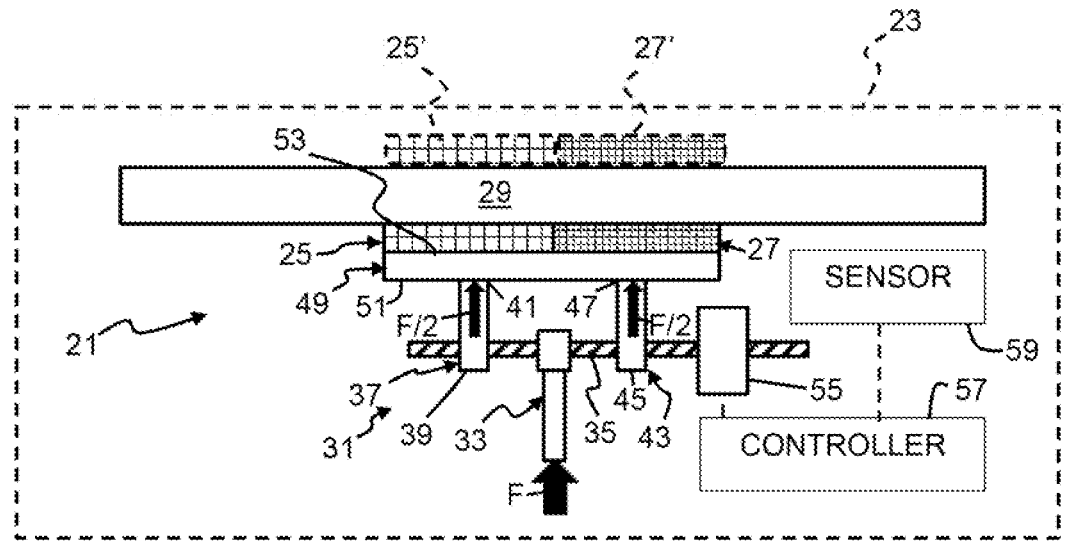
FIGS. 1A-1C show a disc brake system according to a first aspect of the present invention showing an actuator of a pushrod arrangement in different positions.
Figure 1B:
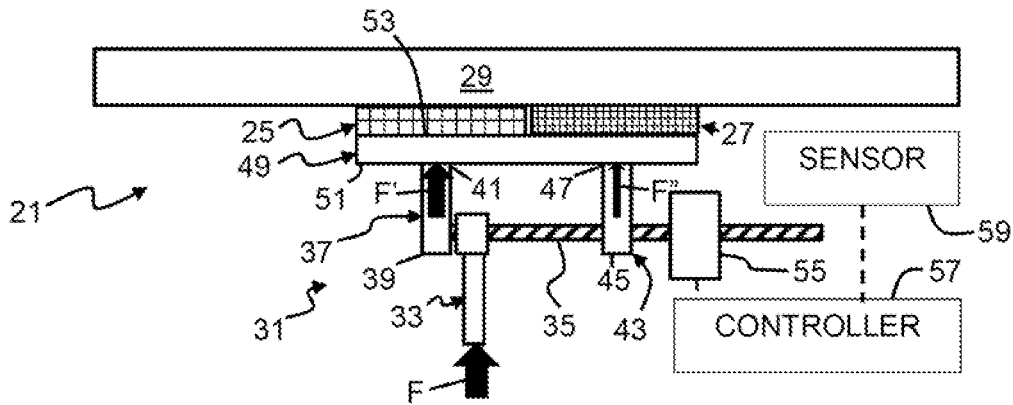
Figure 1C:
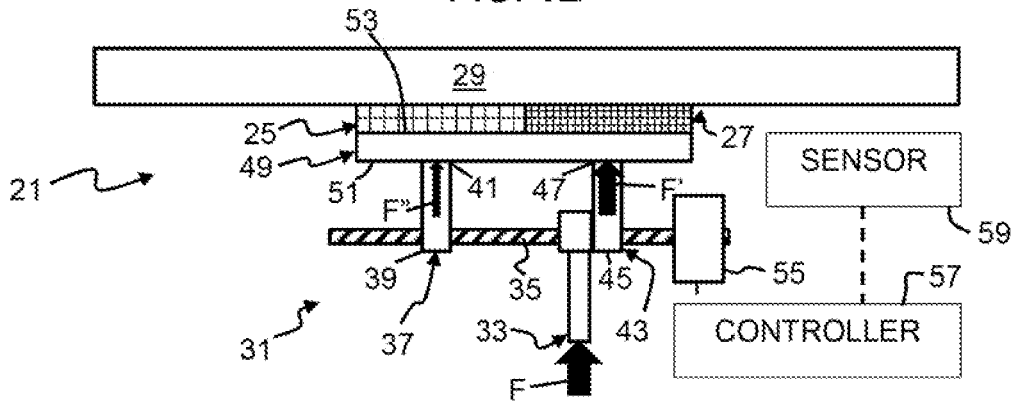

FIGS. 1A-1C show a disc brake system 21 for a vehicle 23 (shown schematically in phantom in FIG. 1A). The disc brake system 21 comprises a first brake pad 25 having a first type of friction material and a second brake pad 27 having a second type of friction material different from the first type of friction material. For example, the first brake pad 25 may have a different performance curve (friction utilized) than the second brake pad 27, where the performance curve depends on various factors such as fade point, slip (relative velocity), temperature, compressibility, etc. The first brake pad 25 might, for example, perform well at low temperatures while the second brake pad 27 might perform well at high temperatures. Similarly, the first brake pad 25 might perform better at low velocity than high velocity, and the second brake pad 27 might perform better at high velocity than low velocity.

The first brake pad 25 and the second brake pad 27 brake the vehicle by being forced against a rotor 29 connected to a wheel of the vehicle. The disc brake system 21 further comprises a pushrod arrangement 31 configured to apply force in varying amounts on both the first brake pad 25 and the second brake pad 27. The pushrod arrangement 31 comprises an actuator 33 movable to different positions relative to the first brake pad 25 and the second brake pad 27 to vary a percentage of total braking force applied by the first brake pad and the second brake pad. The actuator 33 will ordinarily be in the form of a pneumatic piston and cylinder arrangement (piston of actuator shown only) connected via pneumatic lines (not shown) in a conventional manner to a source of pressurized air (not shown), with a valve (not shown) that is opened and closed by operation of a brake pedal (not shown). The actuator 33 will ordinarily but not necessarily be movable relative to the first brake pad 25 and the second brake pad 27 in a direction that is perpendicular to a direction in which the actuator applies force to the first brake pad and the second brake pad.

The illustrated embodiment of the pushrod arrangement 31 comprises a bias bar 35 along which the actuator 33 is movable relative to the first brake pad 25 and the second brake pad 27. The pushrod arrangement 31 further comprises a first pushrod 37 connected at a first end 39 of the first pushrod to the bias bar 35 and a second end 41 of the first pushrod disposed proximate the first brake pad 25, and a second pushrod 43 connected at a first end 45 of the second pushrod to the bias bar and a second end 47 of the second pushrod disposed proximate the second brake pad 27. The pushrod arrangement 31 ordinarily also comprises a beam 49, which may be in the form of, e.g., a rigid plate or rod, having a first surface 51 to which the second end 41 of the first pushrod 37 and the second end 47 of the second pushrod 43 are attached and an opposite second 53 surface to which the first brake pad 25 and the second brake pad 27 are attached.

As illustrated, the bias bar 35 is in the form of a threaded rod that mates with internal threads on the first pushrod 37 and the second pushrod 43 and that is rotated by a drive 55, such as an electric motor. Starting from a central position as shown in FIG. 1A in which a force F applied by the actuator 33 is evenly distributed with one half of the force (F/2) to the first pushrod 37 and one half of the force to the second pushrod 43, rotation of the bias bar 35 in one direction will cause the actuator 33 to move toward the first pushrod and away from the second pushrod as seen in FIG. 1B so that a larger portion F' of a force F applied by the actuator is distributed to the first pushrod than the portion F" distributed to the second pushrod. Rotation of the bias bar 35 in an opposite direction will cause the actuator 33 to move away from the first pushrod 37 and toward the second pushrod 43 as seen in FIG. 1C so that a larger portion F' of a force F applied by the actuator is distributed to the second pushrod than the portion F" distributed to the first pushrod. Ordinarily at least some component of the force F applied by the actuator 33 is distributed to each of the first pushrod 37 and the second pushrod 43, however, if desired, the pushrod arrangement 31 can be constructed to permit all or substantially all of the force applied by the actuator to be applied to one or the other of the first pushrod or the second pushrod, such as by causing the direction of force applied by the actuator to be aligned with the longitudinal axis of the one of the first pushrod or the second pushrod.

The disc brake system 21 can comprise a controller 57 configured to adjust a position of the actuator 33 to alter braking characteristics of the disc brake system at least in response to braking demand, such as by controlling operation of the drive. For example, when there is low braking demand, it may be desirable to position the actuator 33 relative to one of the first brake pad 25 and the second brake pad 27 so that the temperature of the rotor 29 and the one of the brake pads is optimized instead of optimizing brake performance. When there is high brake demand, by contrast, it may be desirable to position the actuator 33 relative to one of the first brake pad 25 and the second brake pad 27 so that brake performance is optimized.

The disc brake system 21 can further comprise one or more sensors 59 that can sense factors that can affect braking, and send one or more signals to the controller 57 to control the drive and position the actuator 33 in response to the signals. For example, a sensor 59 can sense brake pad and/or rotor temperatures and/or environmental temperature and send a signal to the controller 57 which, in turn, can be configured to control the drive 55 to adjust a position of the actuator 33 to alter braking characteristics of the disc brake system in response to the temperature signals. Another sensor 59 may sense velocity of the vehicle 23 of which the disc brake system 21 is a part and send a signal to the controller 57 which can be configured to control the drive 55 to adjust a position of the actuator 33 to alter braking characteristics of the disc brake system at least in response to the velocity of the vehicle, such as to optimize brake performance at high velocity and to optimize characteristics affecting brake life at low velocity. A sensor 59 can sense brake pressure in the brake system's pneumatic lines (not shown), although pressure applied by the actuator 33 may also or alternatively be sensed, which may reflect braking demand, and send a signal to the controller 57 which can be configured to adjust the position of the actuator to alter braking characteristics of the disc brake system at least in response to the signal, such as to optimize brake performance at high pressure/high brake demand and optimize other characteristics such as brake longevity at low pressure/low brake demand. It is presently contemplated that the most important inputs from sensors to the controller 57 to determine where to position the actuator 33 along the bias bar 35 will be, in order, brake pressure, brake temperature, and sliding velocity of the brake pads 25 and 27 relative to the rotor 29, which is directly related to vehicle velocity. It is further presently contemplated that the controller 57 will ordinarily position the actuator 33 along the bias bar 35 in response to such sensed inputs to optimize brake wear and braking force.

Sensors 59 can be provided to provide signals to the controller 57 relating to a variety of different factors, such as braking demand, pneumatic pressure in a piston and cylinder portion of the pushrod arrangement, brake pad and disc temperature, brake pad wear level, wheel load, velocity of a vehicle of which the disc brake system is a part, and a total force applied by the actuator. The controller 57, in turn, can be configured to control the drive 55 to adjust a position of the actuator 33 to alter braking characteristics of the disc brake system 21 in response to one or two or more of those factors, i.e. braking demand, pneumatic pressure in a piston and cylinder portion of the pushrod arrangement, brake pad and disc temperature, brake pad wear level, wheel load, velocity of a vehicle of which the disc brake system is a part, and a total force applied by the actuator. The controller 57 may further be configured to adjust a position of the actuator 33 to alter braking characteristics of the disc brake system 21 to optimize at least one of braking performance, brake wear, brake stress, and brake component thermal loading.

As seen in FIG. 1A, the disc brake system 21 may further include a third brake pad 25' and a fourth brake pad 27' on the opposite side of the rotor 29 from the first brake pad 25 and the second brake pad 27 as might be particularly useful in a floating caliper form of brake. Ordinarily, but not necessarily, the third brake pad 25' will be of the same type as the first brake pad 25 and the fourth brake pad 27' will be of the same type as the second brake pad 27. For example, the third brake pad 25' may have the first type of friction material that is also on the first brake pad 25 and be disposed opposite the first brake pad and the fourth brake pad 27' may have the second type of friction material that is also on the second brake pad 27 and be disposed opposite the second brake pad.

Figure 2:
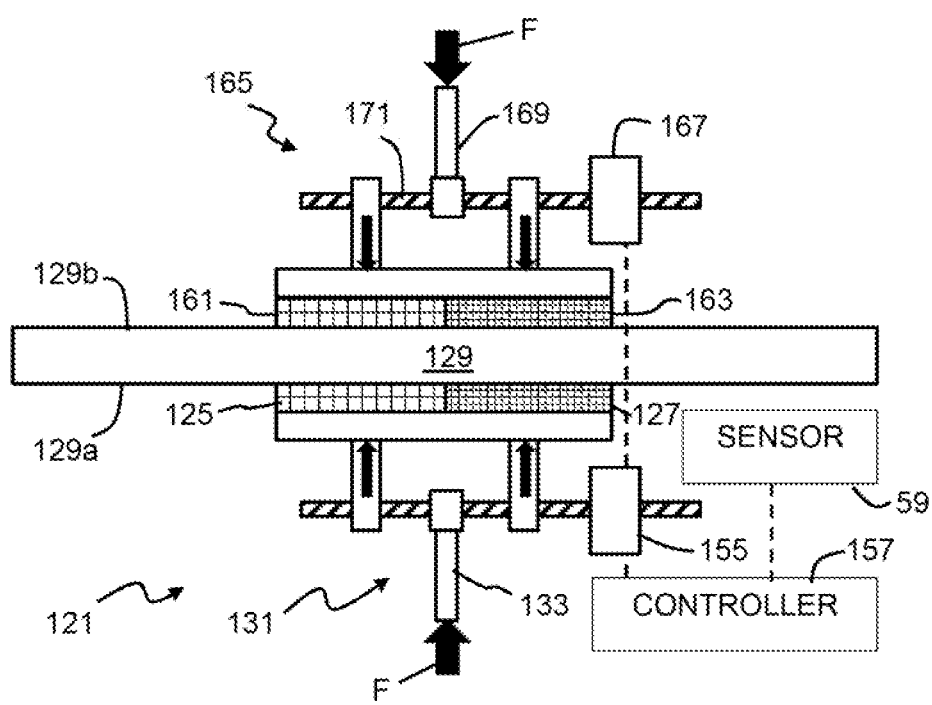
FIG. 2 shows a disc brake system according to a second aspect of the present invention including multiple pushrod arrangements.

As seen in FIG. 2, a disc brake system 121 can comprise the features of the disc brake system 21 shown in FIGS. 1A-IC, such as a first brake pad 125 and a second brake pad 127, and a rotor 129. The description of the structure and functioning of the features of the disc brake system 121 that are the same as or analogous to the features of the disc brake system 21 is substantially the same for purposes of discussion here, and is not repeated for the sake of brevity.

In addition to the surface 129a against which the first brake pad 125 and the second brake pad 127 are urged by the first pushrod arrangement 131, the rotor 129 has a second surface 129b against which at least one additional brake pad is adapted to be urged. The at least one additional brake pad comprises a third brake pad 161 and a fourth brake pad 163.

Ordinarily, but not necessarily, the third brake pad 161 will be of the same type as the first brake pad 125 and the fourth brake pad 163 will be of the same type as the second brake pad 127. For example, the third brake pad 161 may have the first type of friction material that is also on the first brake pad 125 and be disposed opposite the first brake pad and the fourth brake pad 163 may have the second type of friction material that is also on the second brake pad 127 and be disposed opposite the second brake pad.

An illustrative second pushrod arrangement 165 can be configured to apply force on both the third brake pad 161 and the fourth brake pad 163 in substantially the same manner that the first pushrod 131 applies force. In the illustrated embodiment, the drive 167 for the second pushrod arrangement 165 will move the second actuator 169 of the second pushrod arrangement along a bias bar 171 to parallel the movement of the actuator 133 for the first pushrod arrangement 131. The drive 167 can be controlled by a controller 157 in substantially the same way that the drive 155 is controlled by the controller. The second pushrod arrangement 165 may be particularly useful in brake systems that use a fixed caliper.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A disc brake system, comprising:
   a first brake pad having a first type of friction material;
   a second brake pad having a second type of friction material different from the first type of friction material; and
   a pushrod arrangement configured to apply force in varying amounts on both the first brake pad and the second brake pad, the pushrod arrangement comprising an actuator movable to different positions relative to the first brake pad and the second brake pad to vary a percentage of total braking force applied by the first brake pad and the second brake pad.

2. The disc brake system as set forth in claim 1, wherein the pushrod arrangement comprises a bias bar along which the actuator is movable relative to the first brake pad and the second brake pad.

3. The disc brake system as set forth in claim 2, wherein the pushrod arrangement comprises a first pushrod connected at a first end of the first pushrod to the bias bar and a second end of the first pushrod disposed proximate the first brake pad, and a second pushrod connected at a first end of the second pushrod to the bias bar and a second end of the second pushrod disposed proximate the second brake pad.

4. The disc brake system as set forth in claim 3, wherein the pushrod arrangement comprises a beam having a first surface to which the second end of the first pushrod and the second end of the second pushrod are attached and an opposite second surface to which the first brake pad and the second brake pad are attached.

5. The disc brake system as set forth in claim 1, further comprising a controller configured to adjust a position of the actuator to alter braking characteristics of the disc brake system at least in response to braking demand.

6. The disc brake system as set forth in claim 1, further comprising a controller configured to adjust a position of the actuator to alter braking characteristics of the disc brake system at least in response to temperature.

7. The disc brake system as set forth in claim 1, further comprising a controller configured to adjust a position of the actuator to alter braking characteristics of the disc brake system at least in response to velocity of a vehicle of which the disc brake system is a part.

8. The disc brake system as set forth in claim 1, further comprising a controller configured to adjust a position of the actuator to alter braking characteristics of the disc brake system at least in response to a total force applied by the actuator.

9. The disc brake system as set forth in claim 1, further comprising a controller configured to adjust a position of the actuator to alter braking characteristics of the disc brake system at least in response to two or more of braking demand, pneumatic pressure in a piston and cylinder portion of the pushrod arrangement, brake pad and disc temperature, brake pad wear level, wheel load, velocity of a vehicle of which the disc brake system is a part, and a total force applied by the actuator.

10. The disc brake system as set forth in claim 9, wherein the controller is further configured to adjust a position of the actuator to alter braking characteristics of the disc brake system to optimize at least one of braking performance, brake wear, brake stress, and brake component thermal loading.

11. The disc brake system a set forth in claim 1, further comprising a controller configured to adjust a position of the actuator to alter braking characteristics of the disc brake system to optimize at least one of braking performance, brake wear, brake stress, and brake component thermal loading.

12. The disc brake system as set forth in claim 1, comprising a rotor having a first surface against which the first brake pad and the second brake pad are adapted to be urged by the pushrod arrangement.

13. The disc brake system as set forth in claim 1, comprising a rotor having a second surface against which at least one additional brake pad is adapted to be urged.

14. The disc brake system as set forth in claim 13, wherein the at least one additional brake pad comprises a third brake pad and a fourth brake pad.

15. The disk brake system as set forth in claim 14, comprising a second pushrod arrangement configured to apply force on both the third brake pad and the fourth brake pad.

16. The disc brake system as set forth in claim 14, wherein the third brake pad has the first type of friction material and is disposed opposite the first brake pad and the fourth brake pad has the second type of friction material and is disposed opposite the second brake pad.

17. The disk brake system as set forth in claim 16, comprising a second pushrod arrangement configured to apply force in varying amounts on both the third brake pad and the fourth brake pad, the second pushrod arrangement comprising a second actuator movable to different positions relative to the third brake pad and the fourth brake pod.

18. A method for braking a vehicle having a disc brake system, the disc brake system comprising a first brake pad having a first type of friction material, a second brake pad having a second type of friction material different from the first type of friction material, and a pushrod arrangement configured to apply force in varying amounts on both the first brake pad and the second brake pad, comprising:
   moving an actuator of the pushrod arrangement to different positions relative to the first brake pad and the second brake pad to vary a percentage of total braking force applied by the first brake pad and the second brake pad.

* * * * *